(12) United States Patent  
Anzai et al.

(10) Patent No.: US 9,463,608 B2  
(45) Date of Patent: Oct. 11, 2016

(54) FRICTIONAL-FORCE VARIABLE COMPACT AND FRICTIONAL-FORCE VARIABLE STRUCTURE

(75) Inventors: Hidenobu Anzai, Kuki (JP); Koji Sakurai, Kuki (JP); Shin-ichi Kuroda, Kiryu (JP)

(73) Assignees: Fujikura Kasei Co., Ltd., Tokyo (JP); National University Corporation Gunma University, Gunma (JP)

( * ) Notice: Subject to any disclaimer, the term of this patent is extended or adjusted under 35 U.S.C. 154(b) by 272 days.

(21) Appl. No.: 13/981,773

(22) PCT Filed: Jan. 27, 2012

(86) PCT No.: PCT/JP2012/051813  
§ 371 (c)(1),  
(2), (4) Date: Jul. 25, 2013

(87) PCT Pub. No.: WO2012/102382  
PCT Pub. Date: Aug. 2, 2012

(65) Prior Publication Data  
US 2013/0302576 A1 Nov. 14, 2013

(30) Foreign Application Priority Data  
Jan. 27, 2011 (JP) .................................. 2011-015797

(51) Int. Cl.  
*B32B 3/24* (2006.01)  
*B32B 7/02* (2006.01)  
(Continued)

(52) U.S. Cl.  
CPC ............ *B32B 7/02* (2013.01); *C10M 171/001* (2013.01); *F16F 7/08* (2013.01); *B32B 3/266* (2013.01); *B32B 2307/20* (2013.01); *C10M 2201/062* (2013.01); *C10M 2205/043* (2013.01); *C10M 2209/043* (2013.01); *C10N 2230/06* (2013.01);  
(Continued)

(58) Field of Classification Search  
CPC . Y10T 428/249953; F16F 7/08; B32B 3/266  
See application file for complete search history.

(56) References Cited

U.S. PATENT DOCUMENTS 3,705,701 A * 12/1972 Hunt ..................... F16F 1/3849  
                                                                180/291  
5,290,821 A * 3/1994 Sakurai ..................... C08K 3/04  
                                                               521/82

(Continued)

FOREIGN PATENT DOCUMENTS

DE         19509503 A1    9/1996  
EP          1219852 A1    7/2002

(Continued)

OTHER PUBLICATIONS

Federal Agency for Intellectual Property, Patents and Trademarks (Moscow, Russia), Decision of Grant of Patent for Invention and English-language translation issued in corresponding Russian Patent Application No. 2013134932 mailed Sep. 4, 2014 (13 pages).

(Continued)

*Primary Examiner* — William P Watkins, III  
(74) *Attorney, Agent, or Firm* — Wood, Herron & Evans, LLP

(57) ABSTRACT

A frictional-force variable compact of the invention includes: a first surface; a second surface; insulation portion; and an electroconductive portion electrically conducting the first surface to the second surface.

8 Claims, 5 Drawing Sheets

(51) Int. Cl.
*F16F 7/08* (2006.01)
*C10M 171/00* (2006.01)
B32B 3/26 (2006.01)

(52) U.S. Cl.
CPC ....... *C10N 2230/60* (2013.01); *C10N 2240/04* (2013.01); *C10N 2240/08* (2013.01); *C10N 2240/20* (2013.01); *Y10T 428/24802* (2015.01); *Y10T 428/249953* (2015.04)

(56) References Cited

U.S. PATENT DOCUMENTS

| | | | | |
|---|---|---|---|---|
| 5,505,871 | A | * | 4/1996 | Harder ............... C10M 171/001 252/572 |
| 5,607,996 | A | * | 3/1997 | Nichols ................... C08L 7/00 252/511 |
| 6,528,110 | B2 | * | 3/2003 | Szalony ......................... 427/58 |

FOREIGN PATENT DOCUMENTS

| | | |
|---|---|---|
| JP | 08-127790 A | 5/1996 |
| JP | 2008-266407 A | 11/2008 |
| KR | 10-2006-0065784 A | 6/2006 |
| KR | 10-2006-0097737 A | 9/2006 |
| KR | 10-2007-0118901 A | 12/2007 |
| RU | 2282077 C1 | 8/2006 |

OTHER PUBLICATIONS

Lopatnikov, S.L., "Dynamic Equations for New Materials: Porous Media Saturated with Magnetic and Electrorheological Fluids," Database Accession No. 6057585 and Doklady Physics Maik Nauka/Interperiodica Publishing Russia, vol. 43, No. 6, pp. 378-380 (Jun. 1998).

Jiang, Jile et al., "Active Friction Control Based on Electrorheological Effect," Advanced Materials Research, vols. 79-82, pp. 171-174 (2009).

European Patent Office, "Extended European Search Report," issued in corresponding European Patent Application No. 12738836.1 (Dec. 22, 2014).

International Search Report issued in International Patent Application No. PCT/JP2012/051813; Mar. 19, 2012; 3 pages.

The Korean Intellectual Property Office, Decision to Grant issued in corresponding Korean Patent Application No. 10-2013-7019618 and English-language Translation issued Aug. 25, 2015.

* cited by examiner

US 9,463,608 B2

FRICTIONAL-FORCE VARIABLE COMPACT AND FRICTIONAL-FORCE VARIABLE STRUCTURE

CROSS-REFERENCE TO RELATED APPLICATION

This is the U.S. National Phase Application under 35 U.S.C. §371 of International Patent Application No. PCT/JP2012/051813 filed Jan. 27, 2012, which designated the United States and was published in a language other than English, which claims the benefit of Japanese Patent Application No. 2011-015797 filed on Jan. 27, 2011, both of them are incorporated by reference herein. The International Application was published in Japanese on Aug. 2, 2012 as WO2012/102382 A1 under PCT Article 21(2).

TECHNICAL FIELD

The present invention relates to a frictional-force variable compact and a frictional-force variable structure.

BACKGROUND ART

ER fluid is known which produces an electrorheological (hereinafter, "ER") effect that the degree of apparent viscosity increases by applying a voltage thereto. The degree of viscosity of the ER fluid can be reversibly and freely changed by varying a voltage applied to the ER fluid, and furthermore, its responsiveness to change in voltage is excellent.

The ER fluid generally has a state where dispersal phase particles (ER particles) are dispersed in an electrical-insulation dispersion medium such as silicone oil or the like. Therefore, if the ER fluid stands for a long time, the ER particles precipitates and aggregates, and a stable ER effect is less easily obtained.

Consequently, in order to prevent such ER particles from precipitating and aggregating, ER gel is proposed which holds an electrical-insulation dispersion medium having ER particles which are dispersed in a gel skeleton (for example, refer to Patent Document 1).

Such ER gel has a low-frictional state in which a contact area is reduced as the ER particles float the surface thereof when a voltage is not applied thereto, in contrast, a frictional force at the surface thereof increases as the ER particles precipitate in the gel when a voltage is applied. Accordingly, with an ER device in which a sheet-shaped ER gel are disposed between two electrodes, it is possible to electrically control the frictional force. For this reason, such ER device is expected to use for devices utilizing a frictional force such as a vibrational absorption device (a damper or the like), an impact absorption device (a bumper or the like), a locking device (a clamp or the like), or the like.

PRIOR ART DOCUMENTS

Patent Documents

[Patent Document 1] Japanese Unexamined Patent Application, First Publication No. 2008-266407

SUMMARY OF INVENTION

Problems to be Solved by the Invention

In the ER fluid, ER particles easily precipitate and aggregate due to variation with time, in addition to that, there are problems in that an electrical-insulation dispersion medium easily exudes and a seal structure must be provided to the ER particles or the like.

Also, in the ER gel, there is a problem in that an electrical-insulation dispersion medium forming a gel exudes from the surface of the ER gel.

The invention was conceived in view of the above-described circumstances and has an object thereof to provide a frictional-force variable compact and a frictional-force variable structure, which obtains an effect that the frictional force can be electrically controlled without problem of the exudation of an electrical-insulation dispersion medium.

Means for Solving the Problems

A frictional-force variable compact of a first aspect of the invention includes: a first surface; a second surface; an insulation portion constituting a plate-shaped porous body, a porous film, or a plate-shaped body provided with through holes; and an electroconductive portion electrically conducting the first surface to the second surface, the electroconductive portion filling the plate-shaped porous body, the porous film, or the through holes of the plate-shaped body.

In the frictional-force variable compact of the first aspect of the invention, it is preferable that, an electrical conductivity of the electroconductive portion be $1\times10^{-9}$ to $1\times10^{1}$ (S/cm), an electrical conductivity between an entirety of the first surface and an entirety of the second surface be $1\times10^{-14}$ to $1\times10^{-1}$ (S/cm), and the insulation portion and at least the electroconductive portion having a surface area of 0.785 to 7850 ($\mu m^2$) per one exposed portion be exposed at the first surface.

In the frictional-force variable compact of the first aspect of the invention, it is preferable that, the insulation portion and at least the electroconductive portion having a surface area of 0.785 to 7850 ($\mu m^2$) per one exposed portion be exposed at the second surface.

In the frictional-force variable compact of the first aspect of the invention, it is preferable that, a constituent material of the electroconductive portion be at least one material selected from the group consisting of organic electroconductive polymer, carbon compounds, metal oxide, a material including such metal oxide to which a metal is doped, metal hydroxide, and ER particles.

In the frictional-force variable compact of the first aspect of the invention, it is preferable that, an area ratio of the electroconductive portion exposed at the first surface to an entirety of the first surface be 5 to 85% by area.

In the frictional-force variable compact of the first aspect of the invention, it is preferable that, an area ratio of the electroconductive portion exposed at the second surface to an entirety of the second surface be 5 to 85% by area.

In the frictional-force variable compact of the first aspect of the invention, it is preferable that, an area ratio of the electroconductive portion exposed at the first surface to an entirety of the first surface be 5 to 85% by area, and an area ratio of the electroconductive portion exposed at the second surface to an entirety of the second surface be 5 to 85% by area.

A frictional-force variable structure of a second aspect of the invention generates a frictional force by applying a voltage between a first surface and a second surface of the above-described frictional-force variable compact.

Effects of the Invention

It is possible to provide a frictional-force variable compact and a frictional-force variable structure, which obtains an effect that the frictional force can be electrically controlled without problem of the exudation of an electrical-insulation dispersion medium.

EMBODIMENTS FOR CARRYING OUT THE INVENTION

<Frictional-Force Variable Compact>

Figure 1A:
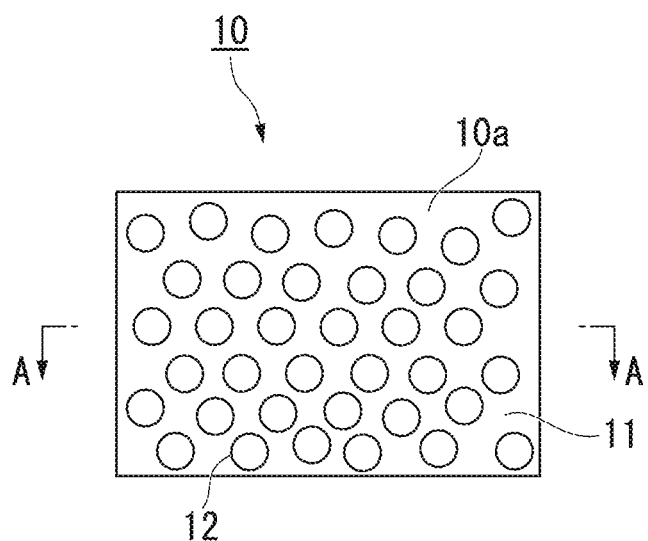
FIG. 1A is a plan view showing an embodiment of a frictional-force variable compact.
Figure 1B:
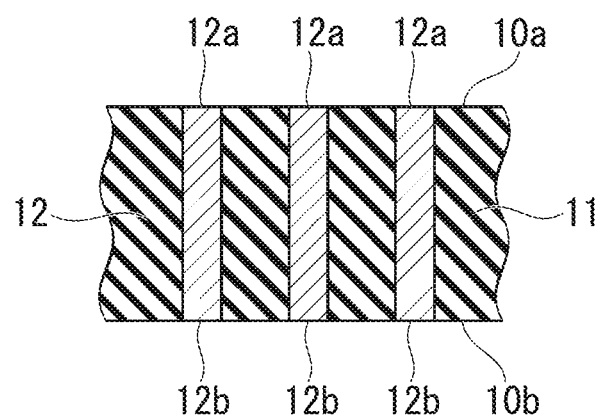
FIG. 1B is a view showing the embodiment of the frictional-force variable compact and is a cross-sectional view taken along the line A-A shown in FIG. 1A.

FIG. 1A is a plan view showing an embodiment of a frictional-force variable compact, and FIG. 1B is a view showing the embodiment of the frictional-force variable compact and is a cross-sectional view taken along the line A-A shown in FIG. 1A.

The frictional-force variable compact 10 of the embodiment includes a first surface 10$a$ and a second surface 10$b$ and includes an insulation portion 11 and an electroconductive portion 12, the electroconductive portion electrically conducting the first surface 10$a$ to the second surface 10$b$.

In the invention, "electrical conductivity of insulation portion" and "electrical conductivity of electroconductive portion" mean the electrical conductivity of the material used to form the insulation portion and the electrical conductivity of the material used to form the electroconductive portion, respectively.

These electrical conductivities represent values (S/cm) defined by the measuring method described below. Before carrying out the measuring method, samples are prepared. Specifically, 0.5 g of material used to form the insulation portion or the electroconductive portion is each put into a tablet-molding jig ($\phi$=10 mm, height 25 mm). Subsequently, disk-shaped samples are molded by applying pressure to the material at 10 MPa for 10 seconds at a normal temperature and under a reduced pressure by use of a hydraulic hand pump (P-1B, manufactured by Riken Keiki Co., Ltd.). Thereafter, as a method for measuring an electrical conductivity, thicknesses (lengths in the height direction) of the samples molded in the above-described manner and electrical resistance values ($\Omega$) between two flat surfaces of the disk-shaped samples are measured, and electrical conductivities are calculated based on the following formula.

(the electrical conductivity of the insulation portion or the electroconductive portion)=(the reciprocal of the electrical resistance value)×(the thickness of the sample)/(the surface area of the cross-sectional face of the sample (circular in shape))

The distance between the first surface 10$a$ and the second surface 10$b$ and the electrical resistance value ($\Omega$) between the first surface 10$a$ and the second surface 10$b$ are measured, and the electrical conductivity between the entirety of the first surface 10$a$ and the entirety of the second surface 10$b$" means the electrical conductivity calculated based on the following formula.

(the electrical conductivity between the entirety of the first surface 10$a$ and the entirety of the second surface 10$b$)=(the reciprocal of the electrical resistance value between the first surface 10$a$ and the second surface 10$b$)×(the distance between the first surface 10$a$ and the second surface 10$b$)/(the surface area of the cross-sectional face of the sample)

In the above formula, "the surface area of the cross-sectional face of the sample" means the average value of the surface area of the first surface 10$a$ and the surface area of the second surface 10$b$.

The electrical conductivity of the electroconductive portion 12 is $1\times10^{-9}$ to $1\times10^{1}$ (S/cm), preferably $1\times10^{-6}$ to $1\times10^{1}$ (S/cm), and more preferably $1\times10^{-4}$ to $1\times10^{0}$ (S/cm).

The electrical conductivity between the entire first surface 10$a$ and the entire second surface 10$b$ is $1\times10^{-14}$ to $1\times10^{-1}$ (S/cm), preferably $1\times10^{-1\circ}$ to $1\times10^{-1}$ (S/cm).

If each of electrical conductivities between the entire first surface 10$a$ and the entire second surface 10$b$ exceeds the upper limit (i.e., $1\times10^{-1}$ (S/cm)), the electrical resistance of the electroconductive portion 12 becomes low, the electrode and the electroconductive portion 12 enters in a short-circuiting state when a voltage is applied, and therefore, a difference in the electrical potentials cannot be sufficiently ensured.

On the other hand, if each electrical conductivity between the entire first surface 10$a$ and the entire second surface 10$b$ is less than the lower limit (i.e., $1\times10^{-14}$), the electrical resistance value of the electroconductive portion 12 becomes high. Accordingly, the current values at the position close to an exposed portion 12$a$ and the position close to an exposed portion 12$b$ become low, it is difficult to concentrate electrical lines of force into each of the exposed portion 12$a$ and the exposed portion 12$b$, the effect that the frictional force can be electrically controlled (frictional electricity effect) is less easily and sufficiently obtained.

As a material used to constitute the electroconductive portion 12, organic electroconductive polymers such as polyaniline, polypyrrole, polythiophene, or the like; carbon compounds such as carbon black, graphite, graphene, carbon nanotube (CNT), or the like; metal oxides such as tin oxide, titanium oxide, zinc oxide, iron oxide, indium tin oxide, or the like; a material including such metal oxide to which a metal is doped; metal hydroxide such as titanium hydroxide or the like, ER particles, or the like can be adopted.

As ER particles, inorganic particles such as silica gel or the like; organic particles such as cellulose, starch, soybean casein, polystyrene system ion-exchange resins, or the like; composite particles for ER fluid, or the like may be used. The composite particles for ER fluid are made of inorganic or organic composite particles, or inorganic composite particles, which are constituted of a core formed of organic polymer particles (acrylic-type particles, polystyrene series particles, melamine series particles, or the like) or inorganic particles (titanium oxide particles, glass-based particles, or the like), and a superficial layer coating the core with inorganic compounds such as the metal oxide or the like having a specific electrical conductivity.

The electrical conductivity of the insulation portion 11 is preferably less than or equal to $1\times10^{-12}$ (S/cm), more preferably less than or equal to $1\times10^{-14}$ (S/cm). If the electrical conductivity of the insulation portion 11 exceeds the upper limit (i.e., $1\times10^{-12}$), a difference in electrical conductivity between the insulation portion 11 and the electroconductive portion 12 becomes low. Consequently, it is difficult to concentrate electrical lines of force into each of the exposed portion 12a and the exposed portion 12b and difficult to obtain a sufficient frictional electricity effect.

As a material used to constitute the insulation portion 11, for example, thermoplastic resins such as polyethylene, polypropylene, polystyrene, an acrylate resin, a polyester resin, or the like; thermosetting resins such as polyamideimide, polyetherimide, polyimide, epoxy resin, or the like; a cross linked polymer made of polyvinyl alcohol and alkoxysilane, teflon resin (registered trademark), or the like are adopted.

Each of the insulation portion 11 and the electroconductive portion 12 is exposed at the first surface 10a, the electroconductive portion 12 serving as a plurality of the exposed portions 12a is distributed thereon.

In the invention, "one exposed portion" means one portion which is exposed at a surface without relating to the configuration and the surface area of the exposed portion.

"at least the electroconductive portion having a surface area of 0.785 to 7850 ($\mu m^2$) per one exposed portion is exposed" means that, the number of the electroconductive portions whose surface area is 0.785 to 7850 ($\mu m^2$) per one exposed portion is one or more and an electroconductive portion having the surface area beyond this range may or may not be exposed.

"size of an area per one exposed portion" indicates a value ($\mu m^2$) defined by measurement value measured by a digital microscope or the like. Specifically, a surface area of an exposed portion in a frictional-force variable compact having a surface of 20 mm×20 mm or more is measured by use of a digital microscope (VHX-1000, manufactured by KEYENCE CORPORATION), and a surface area per one exposed portion is thereby calculated.

At least the electroconductive portion 12 (the exposed portion 12a) having a surface area of 0.785 to 7850 ($\mu m^2$) per one exposed portion is exposed at the first surface 10a. Furthermore, the electroconductive portion 12 (the exposed portion 12a) whose surface area per one exposed portion is preferably 1.77 to 1960 ($\mu m^2$), more preferably 3.14 to 707 ($\mu m^2$), is exposed.

If the surface area per one exposed portion of the electroconductive portion 12 exceeds the upper limit (i.e., 1960 ($\mu m^2$)), electrical charges in the electroconductive portion 12 strongly moves, and it is difficult to concentrate electrical lines of force into the exposed portion 12a.

If the surface area per one exposed portion of the electroconductive portion 12 is less than the lower limit (i.e., 1.77 ($\mu m^2$)), the number of electrical lines of force concentrating into the exposed portion 12a lacks.

The configuration of the exposed portion 12a is not particularly limited to this, may be various shapes such as a circle, an ellipse, a polygon, or the like.

The area ratio of the total of the electroconductive portion 12 (the exposed portion 12a) having a surface area of 0.785 to 7850 ($\mu m^2$) per one exposed portion to the entire first surface 10a is preferably 5 to 85% by area, more preferably 10 to 85% by area.

If less than the lower limit of the area ratio (i.e., 0.785 ($\mu m^2$)), since the surface area at which a frictional electricity effect is produced is reduced, it is difficult to obtain a sufficient frictional electricity effect. If over the upper limit of the area ratio (i.e., 7850 ($\mu m^2$)), a sufficient difference in the electrical potentials is not generated between the first surface 10a and the second surface 10b, and it is thereby difficult to obtain a sufficient frictional electricity effect.

In the frictional-force variable compact 10 of the embodiment, similar to the first surface 10a, both the insulation portion 11 and the electroconductive portion 12 are exposed at the second surface 10b, the electroconductive portion 12 serving as a plurality of the exposed portions 12b is distributed thereon.

All of, the surface area of the exposed portion 12b exposed at the second surface 10b per one exposed portion, and the area ratio of the total of the electroconductive portion 12 (the exposed portion 12b) having a surface area of 0.785 to 7850 ($\mu m^2$) per one exposed portion to the entire second surface 10b, are the same as that of the first surface 10a. That is, the area ratio of the total of the electroconductive portion 12 (the exposed portion 12a) having a surface area of 0.785 to 7850 ($\mu m^2$) per one exposed portion to the entire second surface 10b is preferably 5 to 85% by area, more preferably 10 to 85% by area. In this case, at both the first surface 10a and the second surface 10b, the aforementioned area ratio is realized. This means that, in the frictional-force variable compact 10, it is possible to electrically control the frictional force at each of the first surface 10a and the second surface 10b.

Particularly, it is only necessary to realize the aforementioned area ratio on one of the first surface 10a and the second surface 10b.

The thickness of the frictional-force variable compact 10 is preferably less than or equal to 2000 μm, more preferably 1 to 1000 μm, furthermore preferably 10 to 500 μm.

If the thickness exceeds the upper limit (i.e., 2000 μm), it is necessary to make an applied voltage higher when a voltage is applied, therefor, insulation breakdown or electric discharge is likely to occur when a voltage is applied. Furthermore, expensive and large-scaled power-supply device becomes necessary. If the thickness is less than the lower limit (i.e., 1 μm), it is difficult to obtain a sufficient strength of material against damage which is generated during use.

Method of Manufacturing the Frictional-Force Variable Compact 10

The frictional-force variable compact 10 of the embodiment can be formed, for example, by dispersing particles formed of a constituent material of the electroconductive portion 12 into a molten material of a constituent material of the insulation portion 11 and by carrying out hot press molding or the like. Alternatively, this can be formed by providing cylindrical through holes by use of an electron beam or the like and by filling the through holes with a constituent material of the electroconductive portion 12; and the through holes penetrate through the first surface 10a and the second surface 10b in a plate-shaped body formed of a constituent material of the insulation portion 11.

Action and Effect

In the frictional-force variable compact 10 of the embodiment, since fluid such as gel, silicone oil, or the like, for example, ER fluid or ER gel, is not used, there is not a problem of the exudation of an electrical-insulation dispersion medium.

In the frictional-force variable compact 10 of the embodiment, since the surface area of the exposed portion 12a per one exposed portion is determined to be in a predetermined exposed surface range, when a voltage is applied, lines of electric force is likely to be concentrated into the exposed portion 12a.

Because of this, in the case where the frictional-force variable compact 10 is disposed between a pair of electrodes, an electrostatic attractive force works between the first surface 10a and an electrode facing the first surface 10a (counter electrode), depending on the amount of an applied voltage. As a result, it is possible to electrically control the frictional force between the frictional-force variable compact 10 and the counter electrode.

Furthermore, the frictional-force variable compact 10 of the embodiment has a high level of material strength, therefore has excellent moldability such as sheet-like molding whereas ER gel or the like is difficult to be such molding.

Other Embodiment

The frictional-force variable compact of the invention is not limited to the embodiment shown in FIG. 1, for example, the electroconductive portion may be exposed at the entire second surface.

In addition, the area ratio of the total of the electroconductive portion having a surface area of 0.785 to 7850 ($\mu m^2$) per one exposed portion to the entire first surface may be the same as or different from the area ratio of the total of the electroconductive portion having a surface area of 0.785 to 7850 ($\mu m^2$) per one exposed portion to the entire second surface.

Moreover, for the frictional-force variable compact of the invention, a plate-shaped porous body or a porous film which serves as an insulation portion may be filled with an electroconductive material having an electrical conductivity of $1 \times 10^{-9}$ to $1 \times 10^{1}$ (S/cm).

As a method of manufacturing a frictional-force variable compact using an insulative porous film, the following method can be adopted. In particular, a plate-shaped porous body or a porous film made of polyolefin, polyimide, or the like, is impregnated with a monomer such as aniline, pyrrol, or the like. After polymerizing the monomer, an ammonia treatment, a doping treatment, or the like is carried out as needed, an electrical conductivity is adjusted to be a predetermined electrical conductivity, and it is thereby possible to easily manufacture the frictional-force variable compact.

In this manufacture of the frictional-force variable compact of the embodiment, in order to increase wettability of the monomer with respect to the plate-shaped porous body or the porous film, it is preferable to carry out surface modification such as a plasma treatment, priming, or the like.

Figure 2A:
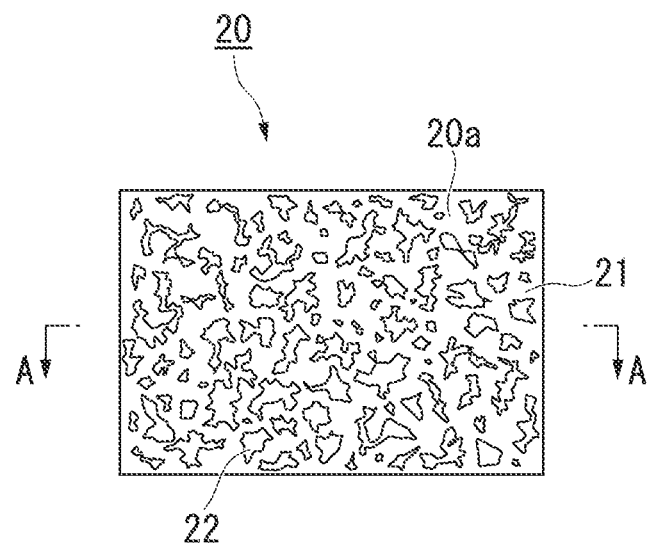
FIG. 2A is a plan view showing other embodiment of a frictional-force variable compact, that is, an example of a frictional-force variable compact using an insulative porous film.
Figure 2B:
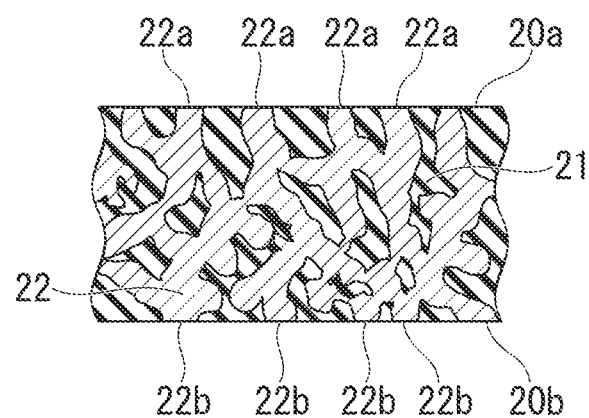
FIG. 2B is a view showing the other embodiment of the frictional-force variable compact and is a cross-sectional view taken along the line A-A shown in FIG. 2A.

FIG. 2A is a plan view showing other embodiment of a frictional-force variable compact, that is, an example of a frictional-force variable compact using an insulative porous film. FIG. 2B is a cross-sectional view taken along the line A-A shown in FIG. 2A.

A frictional-force variable compact 20 of the embodiment includes an insulation portion 21 formed of polyethylene and an electroconductive portion 22 formed of polyaniline. A first surface 20a is electrically conducted to a second surface 20b through the electroconductive portion 22.

Each of the insulation portion 21 and the electroconductive portion 22 is exposed at the first surface 20a, and the electroconductive portion 22 serving as a plurality of the exposed portion 22a is distributed thereon in various configuration.

At least the electroconductive portion 22 (the exposed portion 22a) having a surface area of 0.785 to 7850 ($\mu m^2$) per one exposed portion is exposed at the first surface 20a. Additionally, the area ratio of the total of the electroconductive portion 22 (the exposed portion 22a) having a surface area of 0.785 to 7850 ($\mu m^2$) per one exposed portion to the entire first surface 20a is 10 to 85% by area.

In the frictional-force variable compact 20, similar to the first surface 20a, both the insulation portion 21 and the electroconductive portion 22 are exposed at the second surface 20b, the electroconductive portion 22 serving as a plurality of the exposed portions 22b is distributed thereon. All of, the surface area of the exposed portion 22b exposed at the second surface 20b per one exposed portion, and the area ratio of the total area of the electroconductive portion 22 (the exposed portion 22b) having a surface area of 0.785 to 7850 ($\mu m^2$) per one exposed portion to the entire second surface 20b, are the same as that of the first surface 20a. This means that, in the frictional-force variable compact 20, it is possible to electrically control the frictional force at each of the first surface 20a and the second surface 20b.

According to the frictional-force variable compact of the invention, it is possible to electrically control the frictional force depending on the amount of the voltage applied to the frictional-force variable compact.

As a method of using the frictional-force variable compact, a method of applying a voltage between the first surface and the second surface, a method of applying a voltage to any one of the first surface and the second surface.

In the case of applying the voltage between the first surface and the second surface, a method of pressing a conductive sheet electrode onto each of the first surface and the second surface or a method of pressing a metal plate electrode onto each of the first surface and the second surface and applying a voltage to the electrode which is pressed onto each surface is adopted.

Figure 3A:
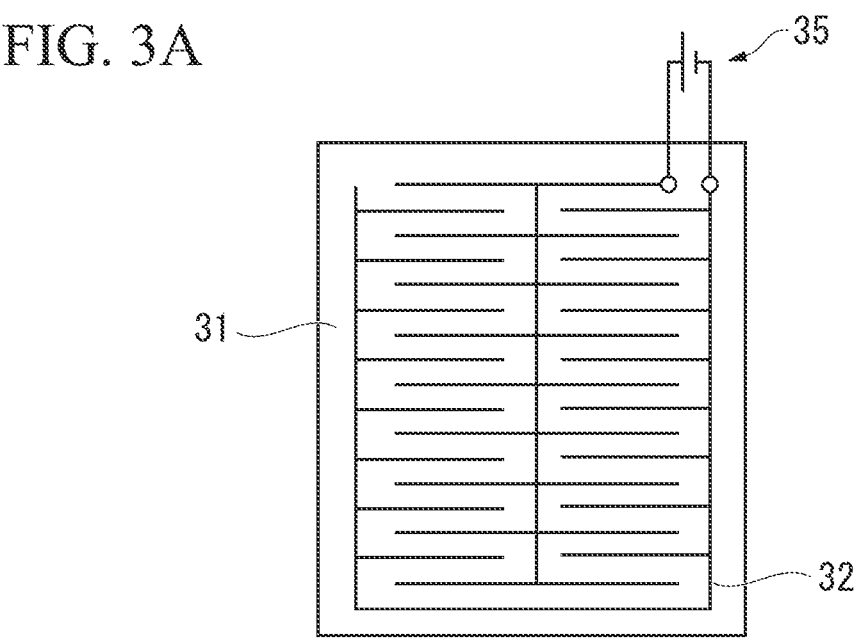
FIG. 3A is a view showing an embodiment of an electrode which is preferably used in conjunction with a frictional-force variable compact and is a plan view showing an electrode in which a fishbone-shaped pattern is formed.
Figure 3B:
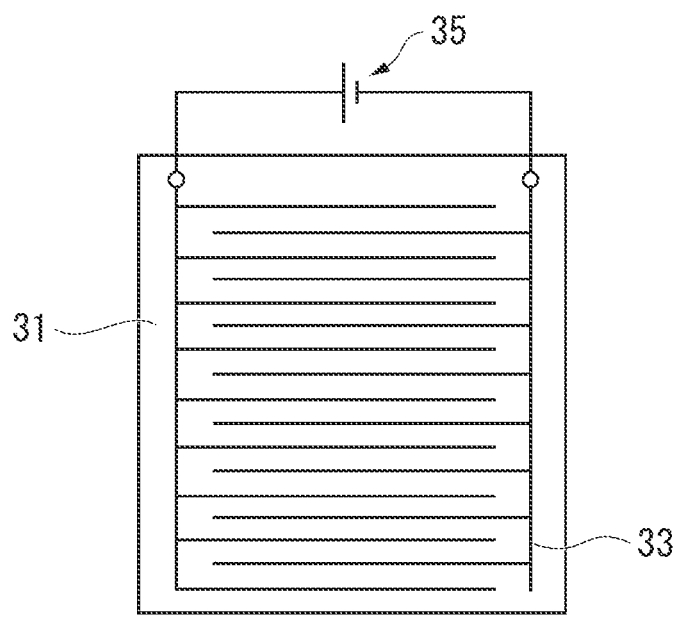
FIG. 3B is a view showing an embodiment of an electrode which is preferably used in conjunction with a frictional-force variable compact and is a plan view showing an electrode in which a ladder-shaped pattern is formed.
Figure 3C:
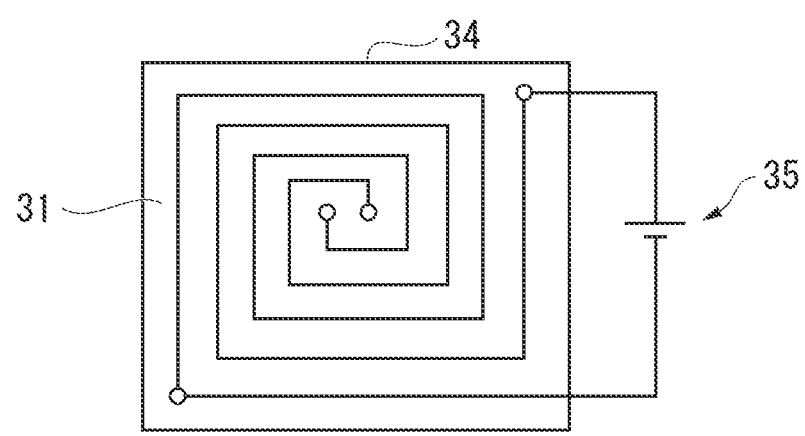
FIG. 3C is a view showing an embodiment of an electrode which is preferably used in conjunction with a frictional-force variable compact and is a plan view showing an electrode in which a spiral-shaped pattern is formed.

In the case of applying the voltage to any one of the first surface and the second surface, electrodes shown in FIGS. 3A to 3C or the like are preferably used.

FIGS. 3A to 3C are plan views showing embodiments of electrodes which are preferably used in conjunction with the frictional-force variable compact. FIG. 3A shows a plate electrode on which a fishbone-shaped pattern 32 is formed on the substrate 31. FIG. 3B shows a plate electrode on which a ladder-shaped pattern 33 is formed on the substrate 31. FIG. 3C shows a plate electrode on which a spiral-shaped pattern 34 is formed on the substrate 31. A power supply 35 is connected to each plate electrode.

As the above-described electrode, an electrode formed by patterning a thin film (metal thin film) formed of a metal such as copper, aluminum, nickel, chrome, or the like is preferably used.

As such metal thin film, a thin film is adopted which are formed by a method such as evaporation coating, plating, sputtering, or the like; a method of applying electroconductive paste and drying this; a method of attaching a metal foil; or the like.

Additionally, the proportion of the metal electrode portion on the substrate 31 to the surface area of the substrate 31 is desirably in the range of 19 to 98%.

Moreover, the above-described frictional-force variable compact 10 is used for devices (a frictional-force variable structure) utilizing a frictional force such as a vibrational absorption device (a damper or the like), an impact absorption device (a bumper or the like), a locking device (a clamp or the like), or the like.

The above-described frictional-force variable structure are provided with the aforementioned frictional-force variable compact 10 and the power supply 35 connected to the first surface 10a and the second surface 10b constituting the frictional-force variable compact 10. In the frictional-force variable structure, as the power supply 35 applies a voltage between the first surface 10a and the second surface 10b, a frictional force is generated between the frictional-force variable compact 10 and a contact portion to with which the frictional-force variable compact 10 is in contact. It is possible to electrically control the frictional force by controlling the voltage which is applied between the first surface 10a and the second surface 10b as stated above.

EXAMPLES

Hereinbelow, the invention will be more particularly described with reference to Examples, the invention is not limited thereto.

<Comparison of Frictional-Force Variable Compact with ER Gel in Material Strength>

Strengths of materials of a frictional-force variable compact (EF sheet) and ER gel (ERG sheet) were measured, respectively. The result is shown in Table 1.

As a material strength, a tension strength was measured. In a measurement of tension strength (MPa), a tensile tester (equipment name: TENSILON RTC-1210, manufactured by ORIENTEC) was used. A tension strength was measured under conditions in which a tension speed is 10 mm/min, a temperature is 25° C., and a relative humidity is 60%.

Test pieces were prepared as described below. The shape of the test piece was a No. 4 dumbbell-shaped tensile form.

Example 1

Manufacture of Test Piece Made of EF Sheet (Base Material PVA/TEOS)

Ion-exchanged water of 100 mL was poured in a beaker, polyvinyl alcohol of 5 g (PVA; produced by Wako Pure Chemical Industries, Ltd., the degree of polymerization thereof is 1500) and antimony-doped tin oxide powder of 6 g (SN-100P, produced by ISHIHARA SANGYO KAISHA, LTD., the electrical conductivity thereof is $1 \times 10^0$ S/cm) were gradually added to the ion-exchanged water while agitating the ion-exchanged water by use of a magnetic stirrer, these were agitated for 12 hours, and therefore, the above-mentioned materials were completely dissolved into the ion-exchanged water. Tetraethoxysilane (TEOS) of 0.5 mL was added to the resultant aqueous solution as stated above, furthermore, hydrochloric acid of 0.1 mol/L serving as a hydrolysis catalyst was added thereto and agitated, thereafter, the above-described aqueous solution left at rest until babbles clear away. Subsequently, a heat-treatment was carried out under 60° C. for 150 minutes, furthermore, moisture was completely removed by carrying out a heat-treatment under 100° C. for 60 minutes, and EF sheet (base material PVA/TEOS) was thereby obtained. A test piece of the EF sheet (base material PVA/TEOS) was obtained by cutting the EF sheet into a No. 4 dumbbell-shaped tensile form.

The electrical conductivity of the electroconductive portion of the resultant test piece of the EF sheet (base material PVA/TEOS) was $1 \times 10^0$ (S/cm), and an entire electrical conductivity between one of the surfaces (first surface) of the EF sheet and the other of the surfaces (second surface) thereof was $1 \times 10^{-8}$ (S/cm).

Each of a base material portion (insulation portion) and a tin oxide portion (electroconductive portion) is exposed at the first surface, and the electroconductive portion having a surface area of 0.785 to 7850 ($\mu m^2$) per one exposed portion was exposed thereat. The surface area per one exposed portion was measured with a digital microscope (VHX-1000, manufactured by KEYENCE CORPORATION) (hereinafter, the same way was adopted).

Each of a base material portion (insulation portion) and a tin oxide portion (electroconductive portion) is also exposed at the second surface.

Example 2

Manufacture of Test Piece Made of EF Sheet (Base Material PS)

Polystyrene of 20 g (produced by PS Japan Corporation, the degree of polymerization thereof is 300) and antimony-doped tin oxide powder of 6 g (SN-100P, produced by ISHIHARA SANGYO KAISHA, LTD., the electrical conductivity thereof is $1 \times 10^0$ S/cm) were mixed and heated up to 130° C., and pressure (10 MPa) was applied thereto for 1 minute under 130° C. Next, the pressured state was released for degasification, again, pressure (30 MPa) was applied to the aforementioned mixed materials and maintaining for 5 minutes. Thereafter, in the state where the pressure (30 MPa) was being applied, EF sheet (base material PS) was obtained by cooling the aforementioned mixed materials. A test piece of the EF sheet (base material PS) was obtained by cutting the EF sheet into a No. 4 dumbbell-shaped tensile form.

The electrical conductivity of the electroconductive portion of the resultant test piece of the EF sheet (base material PS) was $1 \times 10^0$ (S/cm), and an entire electrical conductivity between one of the surfaces (first surface) of the EF sheet and the other of the surfaces (second surface) thereof was $1 \times 10^{-10}$ (S/cm). Each of a base material portion (insulation portion) and a tin oxide portion (electroconductive portion) is exposed at the first surface, and the electroconductive portion having a surface area of 0.785 to 7850 ($\mu m^2$) per one exposed portion was exposed thereat.

Each of a base material portion (insulation portion) and a tin oxide portion (electroconductive portion) is also exposed at the second surface.

Comparative Example 1

Manufacture of Test Piece of ERG Sheet

ER particles used for an ERG sheet were produced as described below.

Antimony-doped tin oxide powder of 30 g (SN-100P, produced by ISHIHARA SANGYO KAISHA, LTD the electrical conductivity thereof is $1 \times 10^0$ S/cm), titanium hydroxide of 10 g (produced by ISHIHARA SANGYO KAISHA, LTD., general name: aqueous titanium, C-II, the electrical conductivity thereof is $9.1 \times 10^{-6}$ S/cm), butyl acrylate of 300 g, 1, 3-butyleneglycol dimethacrylate of 100 g, polymeric initiator of 2 g (azobisiso valeronitrile) were mixed, and the mixture was thereby obtained.

The resultant mixture was dispersed into water of 1800 mL including tribasic calcium phosphate of 25 g as a dispersion stabilizer, suspension polymerization was carried out while agitating this at 60° C. for 1 hour, the resultant product was subjected to an acid treatment, dehydrating and drying were carried out after water washing, inorganic-organic composite particles were obtained. Iron phthalocyanine of 1.5 g (produced by SANYO COLOR WORKS, Ltd., "P-26") was added to the particles of 200 g, a composite processing was carried out by use of a ball mill for 50 hours, subsequently, a jet-stream processing was carried out at a circumferential velocity of 100 m/second for 30 minutes by use of a jet stream processing apparatus (manufactured by Mitsui Mining Co., Ltd. "Mechano-Hybrid"), and ER composite particles were thereby obtained.

Next, dimethyl silicone oil of 400 g (produced by Dow Corning Toray Co., Ltd., "SH-200 (100)", the degree of kinetic viscosity thereof is 100 mm$^2$/s at a room temperature (25° C.), the specific gravity of 0.97/25° C., the refractive index is 1.402/25° C.) was applied to a 2-liter separable flask including a nitrogen introduction tube, a temperature indicator, a mixing device, and the previously-obtained ER composite particles of 600 g was dispersed in this, they were heated up to the range of 110 to 120° C. under a nitrogen stream, and dehydration of ER composite particles was carried out by agitating for 3 hours. A solution of the resultant dehydrated ER composite particles was a mixed solution (A).

After reduced-pressure deaeration is performed at a room temperature for 5 minutes while agitating the resultant mixed solution (A), a compound represented by the following Chemical Formula (1-1), a compound represented by the Chemical Formula (2-1), platinum catalyst A, a curing-rate adjuster (produced by Dow Corning Toray Co., Ltd LTV curing retardant) were uniformly mixed by use of a propeller mixer, and a mixture (B) was thereby obtained.

Particularly, the platinum catalyst A is the catalyst which is obtained by diluting a platinum divinyltetramethyldisiloxane complex having platinum concentration of 12.0% by mass with SH-200 (10) (produced by Dow Corning Toray Co., Ltd., dimethylpolysiloxane having the degree of kinetic viscosity thereof is 10 mm$^2$/s at a room temperature (25° C.) so that the platinum concentration thereof becomes 0.3% by mass.

(Chemical Formula)

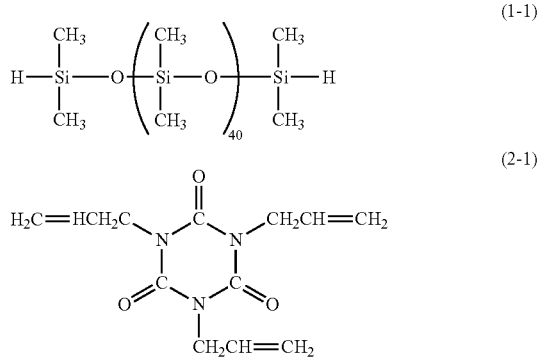

The resultant mixture (B) was loaded into a die having size of 150 mm×150 mm×0.5 mm. In order to carry out a cure treatment for a sequence of ER composite particles, the die was subjected to a heat-treating under an electric field of 2 kV/mm, at 60° C., for 15 minutes, and an ERG-sheet-shaped cured product was thereby obtained.

Subsequently, after the contained amount of silicone oil in the ERG-sheet-shaped cured product was adjusted, the ERG-sheet-shaped cured product was cut into a No. 4 dumbbell-shaped tensile form, a test piece of ERG sheet was obtained.

TABLE 1

| | Material Name | Tension Strength (MPa) |
|---|---|---|
| Example 1 | EF Sheet (Base Material PVA/TEOS) | 33.17 |
| Example 2 | EF Sheet (Base Material PS) | 18.05 |
| Comparative Example 1 | ERG Sheet | 0.69 |

From the result shown in Table 1, it is confirmed that the EF sheets of Examples 1 and 2 have a dramatically high level of material strength as compared with the ERG sheet of Comparative Example 1.

Furthermore, it is confirmed that, the EF sheet of Example 1 has the material strength which is approximately twice higher than that of the EF sheet of Example 2. Accordingly, it is apparent that the material strength can be upgraded by selecting a base material (insulation portion).

<Change in Frictional Force Depending on Voltage>

Variations in a frictional force of the frictional-force variable compact (EF sheet) depending on voltage was evaluated. The result is shown in Table 2.

In this evaluation, an EF sheet of Example 3 and an EF sheet of Example 4 were used. The EF sheet of Example 3 was an evaluation EF sheet having size of 8 cm in length×8 cm in width×1.3 mm in thickness and was obtained by cutting the sheet manufactured in the same way as that of the above-described Example 2 into the size of the evaluation EF sheet.

The EF sheet of Example 4 will be described below.

Example 4

Manufacture of EF sheet

When the EF sheet of Example 4 was prepared, antimony-doped tin oxide powder of 6 g (SN-100P, produced by ISHIHARA SANGYO KAISHA, LTD., the electrical conductivity thereof is 1×10$^0$ S/cm) used when the EF sheet of Example 1 was prepared, was replaced with antimony-doped tin-oxide coated titanium oxide powders of 1.5 g (ET-500W, produced by ISHIHARA SANGYO KAISHA, LTD., the electrical conductivity thereof is 4.2×10$^{-1}$ S/cm), an EF sheet was obtained by the same method as that of the case of Example 1. This EF sheet was cut into the size of the aforementioned evaluation EF sheet, the EF sheet of Example 4 was obtained.

The electrical conductivity of the electroconductive portion of the EF sheet (base material PVA/TEOS) of Example 4 was 4.2×10$^{-1}$ (S/cm), and an entire electrical conductivity between one of the surfaces (first surface) of the EF sheet and the other of the surfaces (second surface) thereof was 1×10$^{-14}$ (S/cm).

Each of a base material portion (insulation portion) and a titanium oxide portion (electroconductive portion) is exposed at the first surface, and the electroconductive portion having a surface area of 0.785 to 7850 (μm$^2$) per one exposed portion was exposed thereat.

Each of a base material portion (insulation portion) and a titanium oxide portion (electroconductive portion) is also exposed at the second surface.

Figure 4:
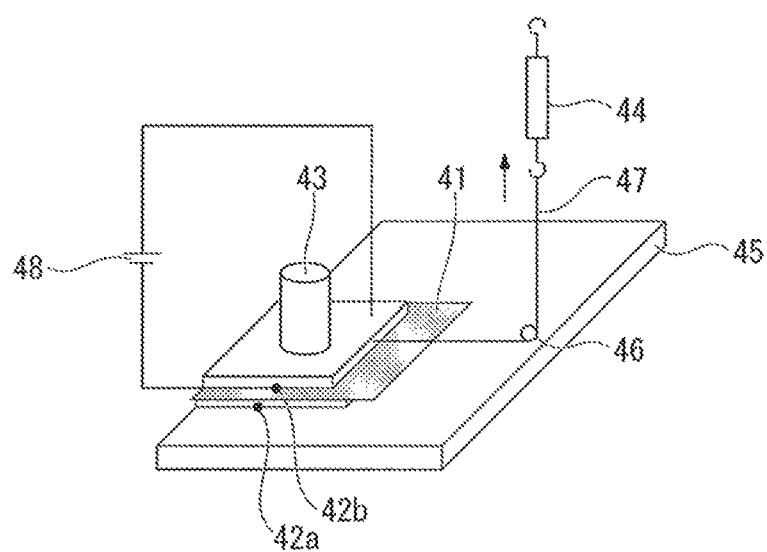
FIG. 4 is a schematic diagram illustrating a method of evaluating change in a frictional force caused by a voltage in Example.

FIG. 4 is a schematic diagram illustrating a method of evaluating change in a frictional force caused by voltage change.

As shown in FIG. 4, an electrode 42a, an evaluation EF sheet 41, and electrode 42b were stacked in layers in this order near the periphery of a support 45.

As the electrode 42a and the electrode 42b, plate electrodes having size of 6 cm in length×4 cm in width×1.0 mm in thickness were used, respectively.

A weight 43 of 100 g was disposed on the face of the electrode 42b opposite to the evaluation EF sheet 41 so that the load thereof is uniformly applied to the electrode 42b. In addition, the electrode 42b was connected to a spring balance 44 with a metal wire 47 via a guide 46 fixed to the position opposite to the above periphery. The metal wire 47 connected the electrode 42b and the spring balance 44 so as to extend in parallel with the surface of the support 45 between the center portion of the side face of the electrode 42b and the guide 46 and so as to extend vertically to the surface of the support 45 between the guide 46 and the spring balance 44. The electrode 42a and the electrode 42b are connected to a power supply 48.

By use of the device shown in FIG. 4, in the case of varying the magnitude of a voltage to be 0, 200, 400, 600, and 800 V, the spring balance 44 was pulled up in the direction vertical to the surface of the support 45 (direction of arrow), and the value (g) indicated by the spring balance 44 was measured when the electrode 42b was begun to move.

TABLE 2

|  | Voltage (V) | | | | |
| --- | --- | --- | --- | --- | --- |
|  | 0 | 200 | 400 | 600 | 800 |
| Example 3 | 110 | 123 | 139 | 173 | 185 |
| Example 4 | 110 | 120 | 130 | 170 | 240 |

From the result shown in Table 2, it was confirmed that an effect can be obtained that the frictional force can be electrically controlled corresponding to the amount of the applied voltage in EF sheets of Examples 3 and 4.

INDUSTRIAL APPLICABILITY

The frictional-force variable compact of the invention is applicable to a device such as a vibrational absorption device (a damper or the like), a power transmission device (a clutch or the like), a locking device (an electrostatic chuck, clamp, or the like), an impact absorption device (a bumper or the like), or the like.

What is claimed is:

1. A frictional-force variable compact comprising:
a first surface;
a second surface;
an insulation portion that forms the first surface and the second surface and includes a plate-shaped porous body, a porous film, or a plate-shaped body provided with through holes, the insulation portion being made from resin; and
an electroconductive portion electrically conducting the first surface to the second surface, the electroconductive portion filling the plate-shaped porous body, the porous film, or the through holes of the plate-shaped body, wherein
the insulation portion and the electroconductive portion do not contain oil.

2. The frictional-force variable compact according to claim 1, wherein
an electrical conductivity of the electroconductive portion is $1\times10^{-9}$ to $1\times10^{1}$ (S/cm),
an electrical conductivity between an entirety of the first surface and an entirety of the second surface is $1\times10^{-14}$ to $1\times10^{4}$ (S/cm), and
the insulation portion and at least the electroconductive portion having a surface area of 0.785 to 7850 ($\mu m^2$) per one exposed portion are exposed at the first surface.

3. The frictional-force variable compact according to claim 2, wherein
the insulation portion and at least the electroconductive portion having a surface area of 0.785 to 7850 ($\mu m^2$) per one exposed portion are exposed at the second surface.

4. The frictional-force variable compact according to claim 1, wherein
a constituent material of the electroconductive portion is at least one material selected from the group consisting of organic electroconductive polymer, carbon compounds, metal oxide, a material including such metal oxide to which a metal is doped, metal hydroxide, and ER particles.

5. The frictional-force variable compact according to claim 1, wherein
an area ratio of the electroconductive portion exposed at the first surface to an entirety of the first surface is 5 to 85% by area.

6. The frictional-force variable compact according to claim 1, wherein
an area ratio of the electroconductive portion exposed at the second surface to an entirety of the second surface is 5 to 85% by area.

7. The frictional-force variable compact according to claim 1, wherein
an area ratio of the electroconductive portion exposed at the first surface to an entirety of the first surface is 5 to 85% by area, and
an area ratio of the electroconductive portion exposed at the second surface to an entirety of the second surface is 5 to 85% by area.

8. A frictional-force variable structure generating a frictional force by applying a voltage between a first surface and a second surface of the frictional-force variable compact according to claim 1.

* * * * *